US012710230B1

(12) United States Patent
Allen

(10) Patent No.: US 12,710,230 B1
(45) Date of Patent: Aug. 18, 2026

(54) LOCKER WITH EQUIPMENT RACK—QUICK DRY SHOE DRAWER

(71) Applicant: AIM Design, LLC, Desoto, TX (US)

(72) Inventor: Sam Allen, Maypearl, TX (US)

(73) Assignee: AIM Design, LLC, Desoto, TX (US)

( * ) Notice: Subject to any disclaimer, the term of this patent is extended or adjusted under 35 U.S.C. 154(b) by 790 days.

(21) Appl. No.: 17/870,501

(22) Filed: Jul. 21, 2022

Related U.S. Application Data

(63) Continuation-in-part of application No. 17/189,647, filed on Mar. 2, 2021, now Pat. No. 11,609,045, (Continued)

(51) Int. Cl.

| | |
|---|---|
| ***F26B 21/00*** | (2026.01) |
| ***A47B 61/00*** | (2006.01) |
| ***A47B 61/02*** | (2006.01) |
| ***A47B 88/40*** | (2017.01) |
| ***A63B 71/00*** | (2006.01) |
| ***F26B 9/00*** | (2006.01) |
| ***F26B 9/06*** | (2006.01) |

(52) U.S. Cl.
CPC .......... *F26B 21/006* (2013.01); *A47B 61/003* (2013.01); *A47B 61/02* (2013.01); *A63B 71/0036* (2013.01); *F26B 9/003* (2013.01); *F26B 9/06* (2013.01); *A47B 88/40* (2017.01)

(58) Field of Classification Search
CPC .......... F26B 21/006; F26B 9/003; F26B 9/06; A47B 61/003; A47B 61/02; A47B 88/40; A63B 71/0036
See application file for complete search history.

(56) References Cited

U.S. PATENT DOCUMENTS 3,019,620 A * 2/1962 Costantini ............... F25D 17/06 62/414
5,377,849 A 1/1995 Martin
(Continued)

FOREIGN PATENT DOCUMENTS

| | | |
|---|---|---|
| CH | 712116 A2 | 2/2016 |
| FR | 3002313 A1 | 2/2013 |
| JP | 2010194275 A | 9/2010 |

OTHER PUBLICATIONS

Clemson Football Operations Facility Construction Documents, dated Mar. 15, 2016, p. 290.
(Continued)

*Primary Examiner* — Jessica Yuen
(74) *Attorney, Agent, or Firm* — James E. Walton

(57) ABSTRACT

A locker includes a pair of spaced-apart upstanding sidewalls and at least one shelf extending between the sidewalls, the shelf and sidewalls defining a compartment. A rack is disposed in the compartment and extends upwardly from the shelf. The rack is dimensioned and configured to support at least a pair of shoulder pads and preferably both pads and a helmet. The rack optionally includes a ventilation system, and the ventilation system may be incorporated into a multi-locker ventilation system. The locker also include a quick drying shoe drawer that is located in the bottom left of the locker. The drawer is dimensioned and configured to support at least a pair of shoes and other small equipment. The drawer also has a ventilation system pushing air through it to dry and deodorize the equipment being stored in it.

9 Claims, 8 Drawing Sheets

Related U.S. Application Data which is a continuation of application No. 15/804,286, filed on Nov. 6, 2017, now Pat. No. 10,935,316.

(56) References Cited

U.S. PATENT DOCUMENTS

| | | | | |
|---|---|---|---|---|
| 6,880,711 | B2 | 4/2005 | Collier | |
| 8,365,950 | B2 | 2/2013 | Yuyama et al. | |
| 10,935,316 | B2 | 3/2021 | Allen | |
| 11,609,045 | B1 | 3/2023 | Allen | |
| 12,092,396 | B2 | 9/2024 | Allen | |
| 2005/0204579 | A1 | 9/2005 | Rosseau et al. | |
| 2006/0112828 | A1 | 6/2006 | Ehlers | |
| 2008/0218047 | A1 | 9/2008 | Buczynski et al. | |
| 2011/0025181 | A1 | 2/2011 | Vinke et al. | |
| 2012/0193312 | A1 | 8/2012 | Sjolander et al. | |
| 2015/0136715 | A1 | 5/2015 | Tremblay | |
| 2016/0258108 | A1 * | 9/2016 | Jindra | A47B 81/00 |
| 2017/0290726 | A1 | 10/2017 | Hovenden et al. | |
| 2017/0295928 | A1 * | 10/2017 | Allen | A47B 61/04 |

OTHER PUBLICATIONS

Office Action dated Apr. 4, 2019 from U.S. Appl. No. 15/804,286.
Amendment dated Jun. 25, 2019 from U.S. Appl. No. 15/804,286.
Final Office Action dated Dec. 11, 2019 from U.S. Appl. No. 15/804,286.
Amendment After Final dated Jan. 13, 2020 from U.S. Appl. No. 15/804,286.
Advisory Action dated Mar. 10, 2020 from U.S. Appl. No. 15/804,286.
RCE and Amendment dated Mar. 23, 2020 from U.S. Appl. No. 15/804,286.
Office Action dated May 1, 2020 from U.S. Appl. No. 15/804,286.
Amendment dated Jun. 2, 2020 from U.S. Appl. No. 15/804,286.
Final Office Action dated Aug. 5, 2020 from U.S. Appl. No. 15/804,286.
Amendment After Final dated Sep. 30, 2020 from U.S. Appl. No. 15/804,286.
Advisory Action dated Oct. 15, 2020 from U.S. Appl. No. 15/804,286.
RCE and Amendment dated Oct. 20, 2020 from U.S. Appl. No. 15/804,286.
Notice of Allowance dated Nov. 3, 2020 from U.S. Appl. No. 15/804,286.
Office Action dated Jul. 22, 2022 from U.S. Appl. No. 17/189,647.
Amendment dated Oct. 19, 2022 from U.S. Appl. No. 17/189,647.
Notice of Allowance dated Nov. 23, 2022 from U.S. Appl. No. 17/189,647.
Office Action dated Oct. 26, 2023 from U.S. Appl. No. 18/187,099.
Amendment dated Nov. 14, 2023 from U.S. Appl. No. 18/187,099.
Final Office Action dated Dec. 7, 2023 from U.S. Appl. No. 18/187,099.
Amendment After Final dated Dec. 29, 2023 from U.S. Appl. No. 18/187,099.
Advisory Action dated Jan. 23, 2024 from U.S. Appl. No. 18/187,099.
Request for Continued Examination dated Feb. 8, 2024 from U.S. Appl. No. 18/187,099.
Office Action dated Feb. 29, 2024 from U.S. Appl. No. 18/187,099.
Amendment dated Apr. 19, 2024 from U.S. Appl. No. 18/187,099.
Notice of Allowance dated May 15, 2024 from U.S. Appl. No. 18/187,099.

* cited by examiner

LOCKER WITH EQUIPMENT RACK—QUICK DRY SHOE DRAWER

This application is a continuation in part of U.S. patent application Ser. No. 17/189,647, filed 2 Mar. 2021, titled "Locker with Equipment Rack, a continuation of U.S. patent application Ser. No. 15/804,286, filed 6 Nov. 2017, titled "Locker with Equipment Rack," which issued as U.S. Pat. No. 10,935,316, on 2 Mar. 2021, both of which are incorporated herein for all purposes.

BACKGROUND

1. Field of the Invention

The present invention relates generally to improvements in lockers or storage cabinets used in athletic or sporting facilities, and more specifically to compartments within such lockers configured and adapted especially for storing equipment such as pads or helmets.

2. Description of Related Art

The aesthetics and utility of lockers or storage cabinets in "locker rooms" of athletic and sporting facilities of sports teams and country clubs, for example, have become a measure of the quality and prestige of such organizations and an increasingly important aspect of recruiting new team or club members. Modern lockers are a far cry from the simple wood or metal cabinets of the past.

Modern lockers may incorporate storage for specific items of equipment, such as helmets and shoes, and features promoting comfort and luxury. One consistent problem in locker rooms of all types is the storage of heavy, cumbersome equipment such as football, lacrosse, or hockey helmets and pads. There is a constant need for improvement in this and other aspects of such lockers.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
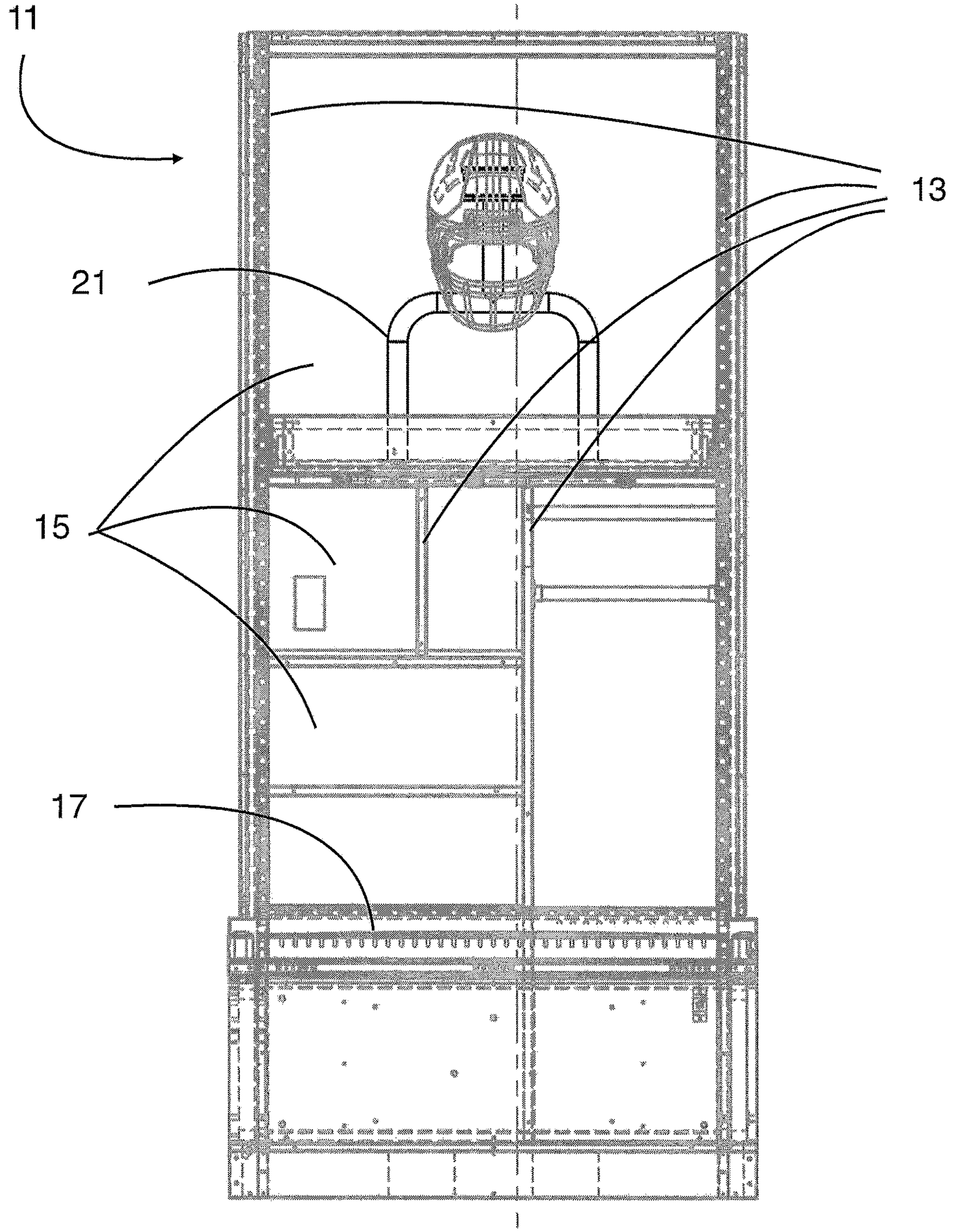
FIG. 1 is a front elevation view, partially in section, of a locker incorporating the equipment storage fixture or rack according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the locker according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
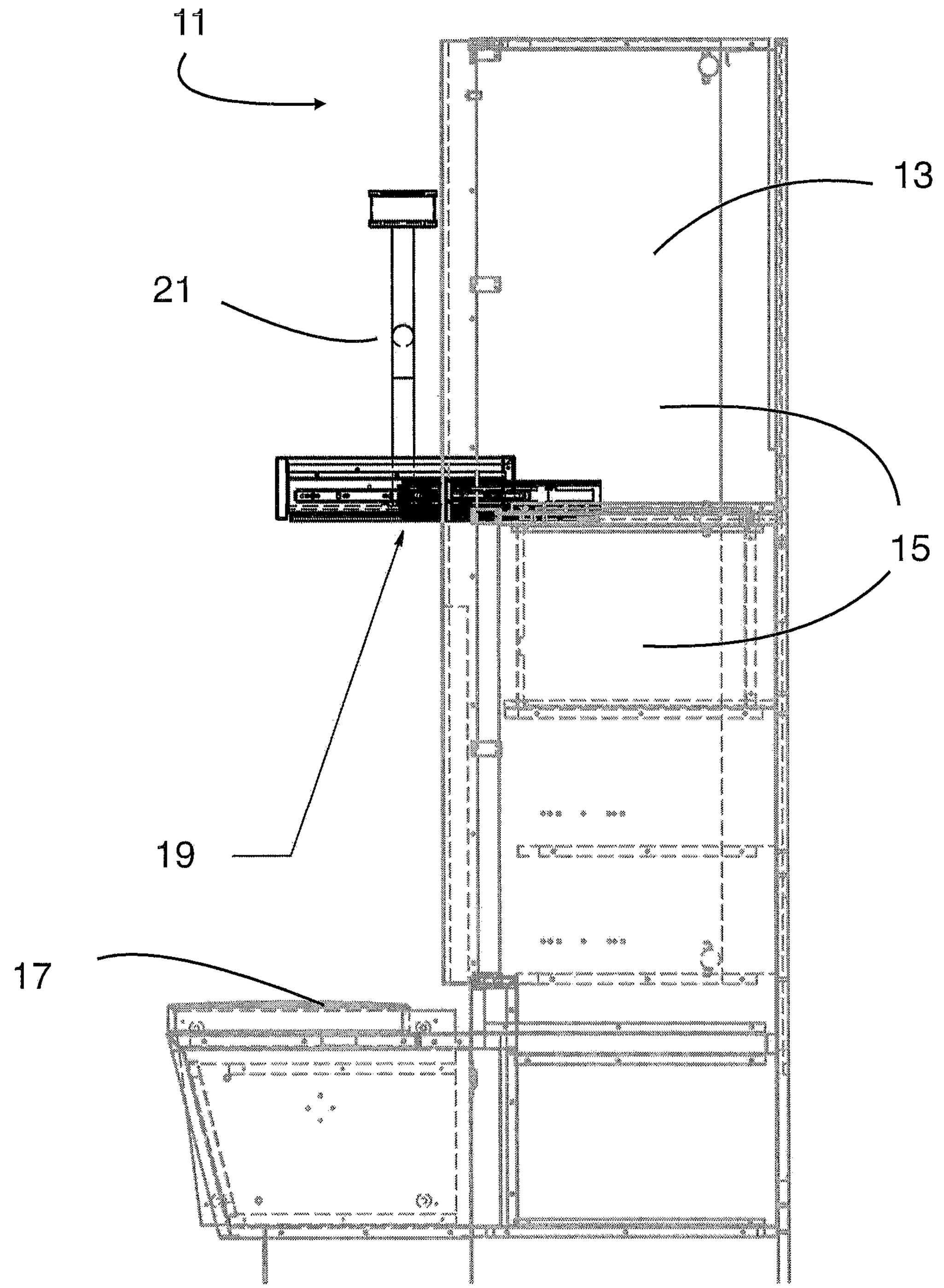
FIG. 2 is a side elevation view, partially in section of the locker of FIG. 1.

Referring now to FIGS. 1 and 2 in the drawings, a locker 11 according to an embodiment of the present application is depicted. Locker 11 comprises a pair of upstanding sidewalls 13 that generally define the extent of the locker. Each locker 11 may be installed adjacent to another, similar or identical locker, with its rear against a wall, and its front facing the interior of the locker room.

Between the sidewalls 13 of locker 11, a plurality of compartments 15 are defined by shelves or other horizontally extending surfaces or platforms. As used herein, "sidewall" or "sidewalls" may refer to either "main" sidewalls 13 or other upstanding or generally vertical sidewalls arranged between the "main" sidewalls. Multiple additional sidewalls 13 may be placed between the "main" or exterior sidewalls 13 to define compartments 15 in cooperation with generally horizontally extending shelves. Each compartment 15 may be sized and otherwise configured for storage of clothing or sporting equipment or other items and may include at least one door, which may be lockable. Locker 11 may also be provided with a bench seat 17 or similar seating arrangement.

Among the compartments in locker 11 according to the present application may be a helmet or pad compartment, generally located at the upper end of locker 11. An equipment fixture or rack 21 may be disposed on the shelf defining the lower extent of the helmet or pad compartment. Rack 21 may be configured and arranged to store a football or similar helmet alone or together with shoulder pads or other protective equipment. The shelf on which rack 21 is mounted may preferably be provided with drawer slides to permit the shelf and rack 21 to move horizontally in and out of the compartment of locker 11 between an extended or deployed position and a stored position for ease of use, as shown in FIG. 2 (see also FIG. 5, below). The shelf may also be provided with a tilting feature to permit downward tilting of the shelf when pulled forward or out of the compartment, again for ease of placing and removing equipment on rack 21. Rack 21 may be mounted directly to a shelf, with or without sliding or tilting features, or to a separate platform or other member carried by the shelf or sidewall 13.

Figure 3A:
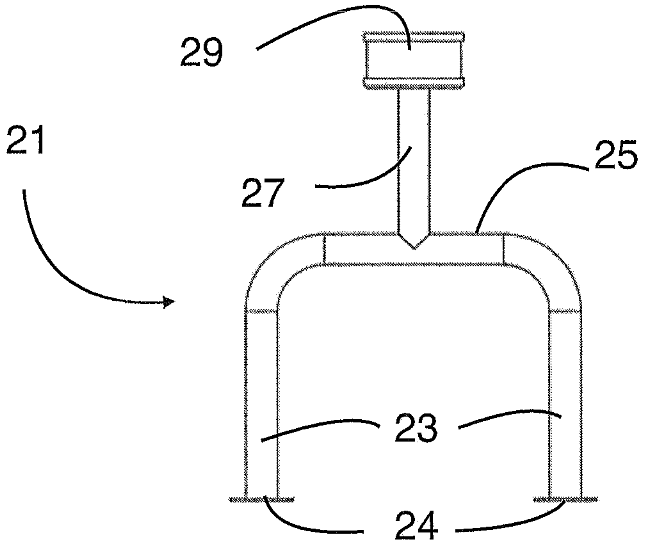
FIGS. 3A and 3B are elevation and perspective views of the equipment storage fixture or rack shown in FIGS. 1 and 2.
Figure 3B:
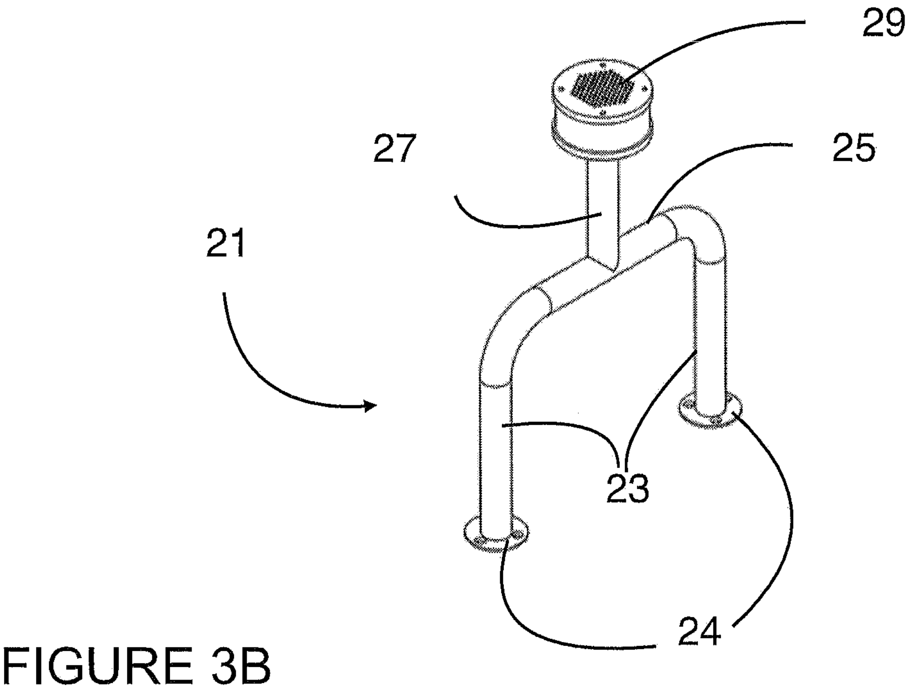

As shown in FIGS. 3A and 3B, rack 21 may comprise a pair of upstanding, spaced-apart posts 23, which are secured to the shelf or platform by flanges 24. Posts 23 may be connected at their upper ends by a cross-member or crossbar 25. The distance or dimension between posts 25 may be narrower than a pair of shoulder pads and the height of crossbar 25 may be sufficient to support the pads above the shelf so that the pads contact only rack 21. A helmet post 27 may extend upwardly from approximately the center or middle of crossbar 25 and may terminate in a helmet support member 29, which contacts and supports the interior of a helmet. Helmet post 27 may be dimensioned so that a helmet is suspended entirely above crossbar 25 (as shown in FIG. 1). Helmet support member 29 may incorporate a ventilator or helmet ventilation system. The ventilator may be an electric fan contained in a perforated housing that is operably associated with support member 29, preferably a model QFR0812SH-F00 from Delta Products Corp., 46101 Fremont Blvd, Fremont, CA 94538, U.S.A. The fan may circulate air in, around, and through a helmet or other equipment stored on post 27 for drying and deodorization purposes. Alternatively, the ventilator may be coupled to a "forced air" ventilation or air circulation system that is part of locker 11 or a system of lockers or a room HVAC system.

The fan may be powered by AC or DC electric current and may be provided with a switch to control its operation. The switch may be manually operated, or may be actuated automatically by the weight of the helmet on post 27 and support member 29, manually, by a timer, by voice actuation, by detection of the presence of a condition such as heat, moisture, or odor, or the like.

Rack or fixture 21 may be constructed of steel or aluminum tubing, welded or otherwise secured together in sections comprising posts 23, crossbar 25, and post 27 and secured to its shelf by screws or bolts through a flange, as illustrated. The hollow nature of the preferred tubing may permit passage of electric cables and air or other gases for power or ventilation and reduces the overall weight of rack 21.

Figure 4:
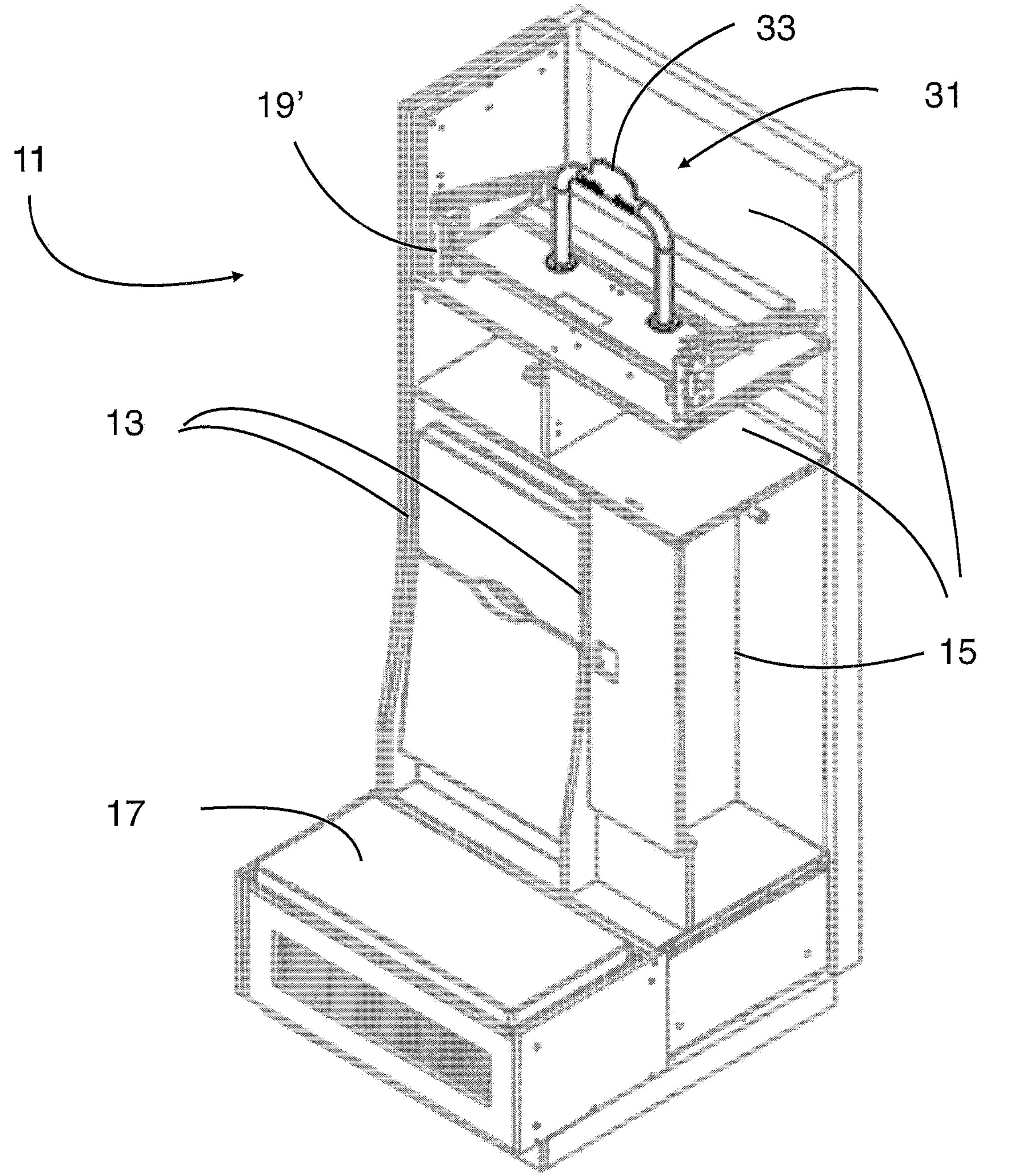
FIG. 4 is a perspective view of a locker incorporating the equipment storage fixture or rack according to a second embodiment of the present application.
Figure 5:
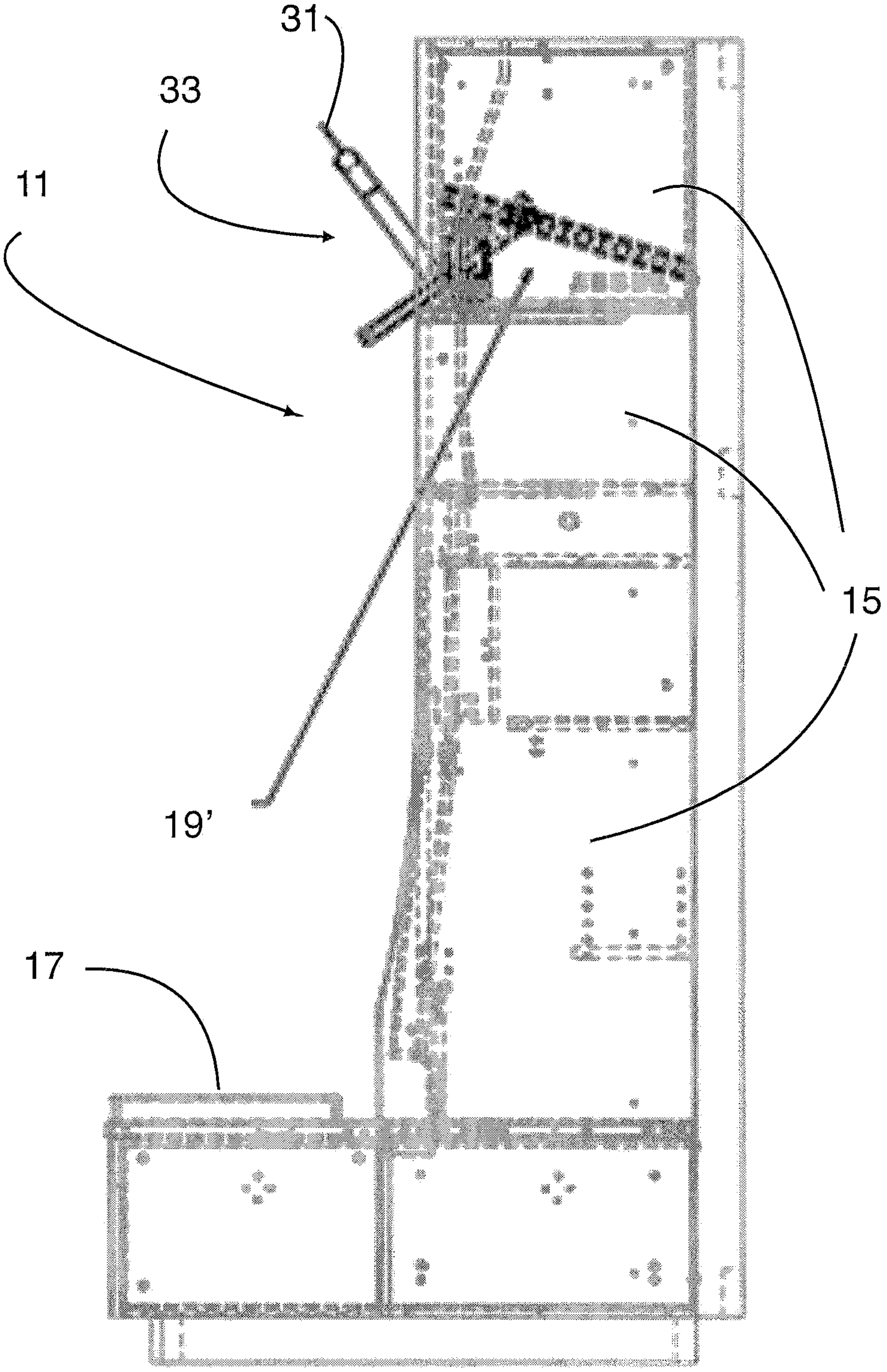
FIG. 5 is a side elevation view, partially in section, of the locker of FIG. 4.

FIGS. 4 and 5 depict a locker 11 similar to that of FIGS. 1 and 2, but incorporating a fixture or rack 31 according to another embodiment of the present application. Fixture or rack 31 is similar in form and operation to that illustrated in FIGS. 3A and 3B, except that helmet post 27 and support member 29 are omitted. This embodiment is intended for storage of pads, e.g. shoulder pads, only, and no helmet. Accordingly, a small vertical projection or tab takes the place of helmet post 27 and serves to help "center" or locate pads on rack 31. Further, as shown in FIG. 5, rack 31 may be mounted on a shelf with a tilting feature 19' that permits forward tilting of shelf and rack 31, with or without sliding the shelf forward or out of the storage compartment so that the shelf and rack 31 are movable between an extended or deployed position and a storage position. Again, rack 31 may be mounted directly to a shelf or to a platform coupled to or carried by the shelf or sidewall 13 of locker 11.

Rack or fixture 21 may include lights, speakers, or other functional and/or aesthetic features to improve the desirability of rack or fixture 21. For example, LED lights may be added to rack 21, so that when a helmet is placed on rack 21 the LED light illuminates to backlight the helmet. Such aesthetic features, such as lighting and sound systems, can be integral across a multi-locker system, so that the effects can be controlled from a central location and/or server. It will be appreciated that such automated systems can also be used in managerial and/or security functions to determine the presence or absence of a helmet and/or shoulder pads on rack 21. Thus, an equipment manager can quickly determine from a central server whether specific helmets and/or shoulder pads are missing.

Figure 6:
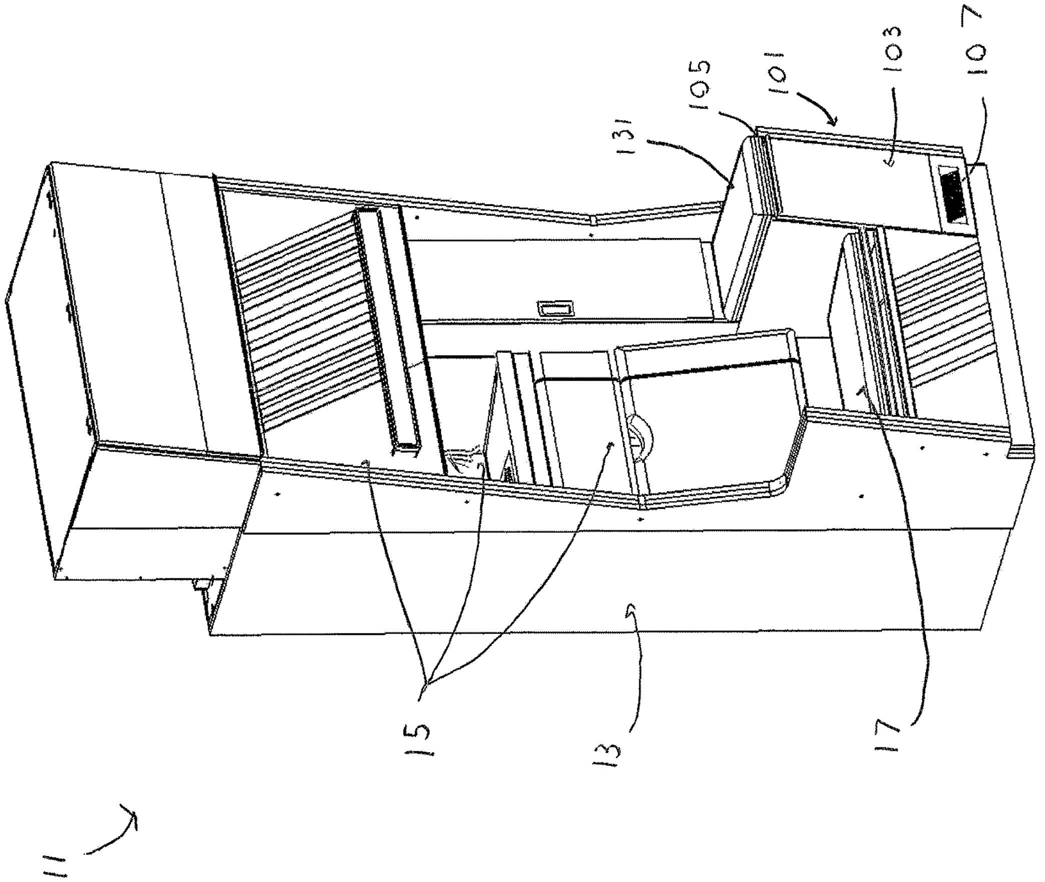
FIG. 6 is a perspective view of a locker incorporating the quick drying drawer according to a third embodiment of the present application.
Figure 7:
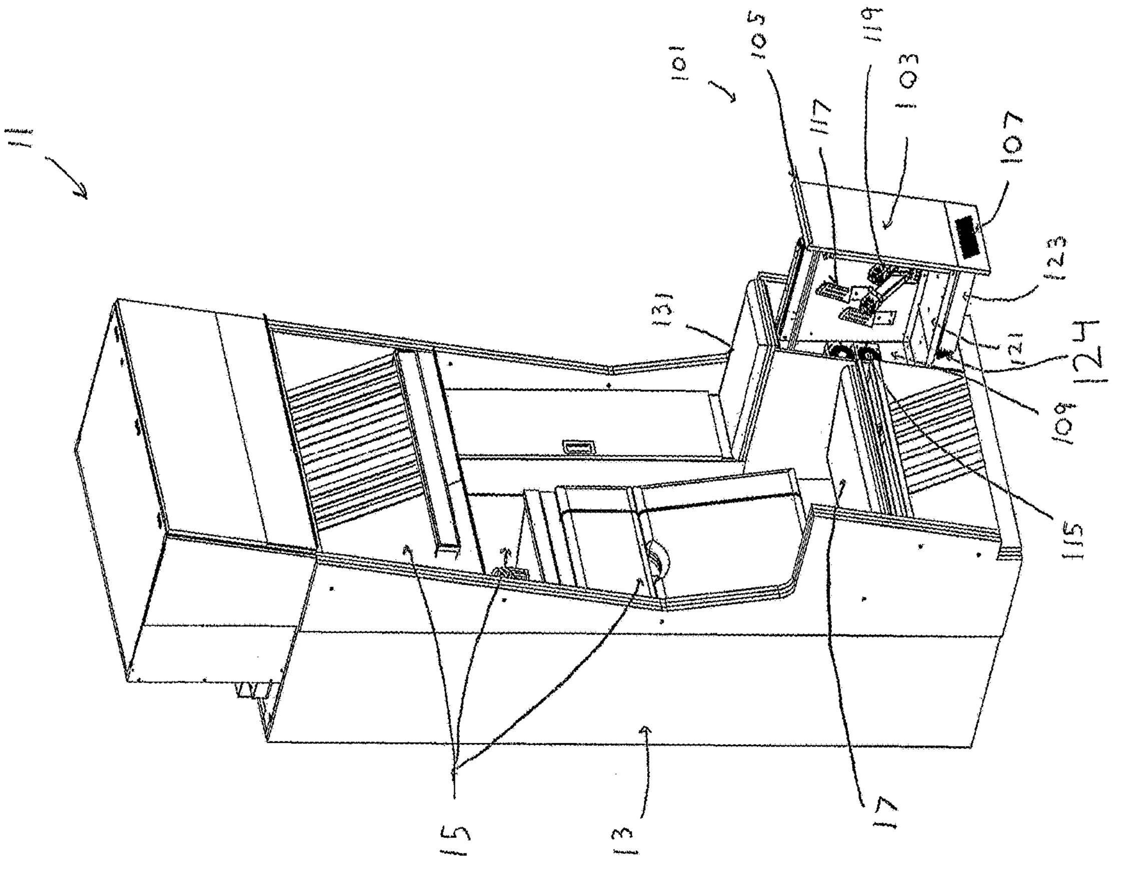
FIG. 7 is a perspective view of the locker from FIG. 6 with the drawer extended.

Referring now to FIGS. 6 and 7 in the drawings, an alternative embodiment of locker 11 is shown. FIGS. 6 and 7 depict a locker 11 similar to that of FIGS. 4 and 5 but incorporating a quick drying shoe drawer 101 according to another embodiment of the present application. Drawer 101 is located on the right side of locker 11 towards the bottom next to where seat bench 17 is. Side walls 13 also extends further out in this embodiment to act as a side wall for drawer 101. FIG. 6 shows that drawer 101 is comprised of a front plate 103, a handle 105, a vent 107, and a cushion 131. While not shown, it is appreciated that a lock can be inserted onto handle 105 to prevent individuals from opening drawer 101. Vent 107 is inserted towards the bottom of front plate 103 in order to help facilitate air flow into and out of drawer 101. Cushion 131 on top of drawer 101 can be used as an arm rest for someone in seat 17 or as another seat for someone using the locker. FIG. 7 further shows drawer 101 extended out from locker 11 and the orientation of how equipment would be stored in drawer 101 in relation to locker 11.

Figure 8B:
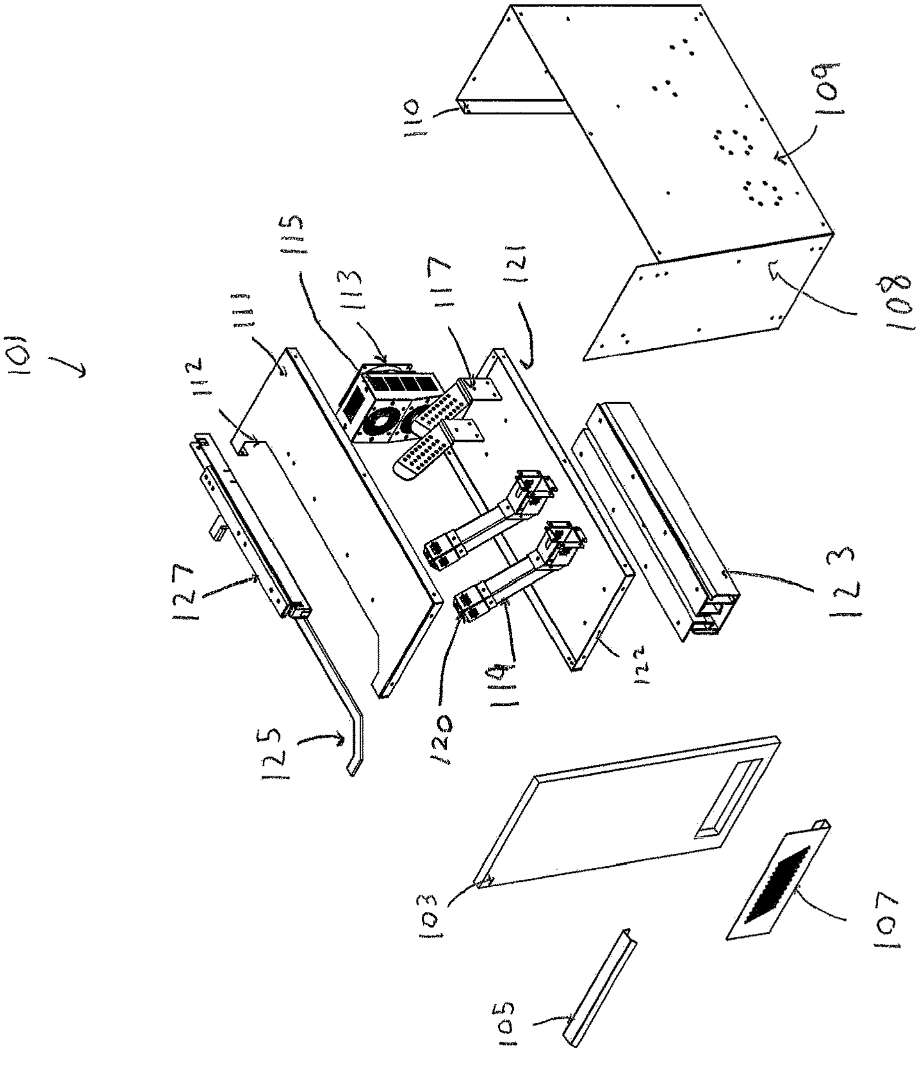
FIGS. 8A and 8B are perspective views of the quick drying drawer from FIG. 6.
Figure 8A:
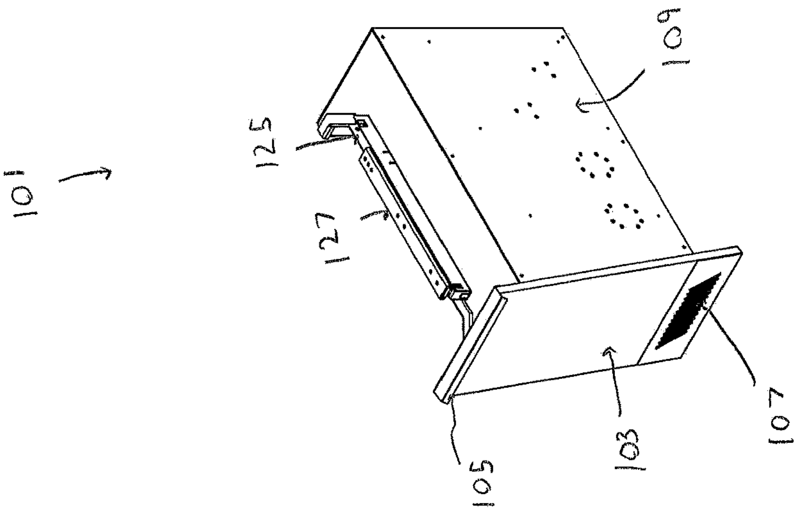

Referring now to FIGS. 8A and 8B, a closer view of drawer 101 is shown. FIG. 8A shows the right side of drawer 101 with all of the components still together while FIG. 8B shows the exploded view of these components. These figures show that along with front plate 103, handle 105, and vent 107, drawer 101 further comprises support casing side wall 108, support casing back wall 109, and support casing protrusions 110, upper plate 111, fan fastener 113, fan 115, vented protrusions 117, vented posts 119, vent 120, base plate 121, base lip 122, base support 123, base groove 124, rail support 125, and rail guide 127.

The right side of drawer 101 is defined and supported by a support casing which forms three of the walls of the compartment. This support casing is formed by support casing side walls 108, support casing back wall 109, and support casing protrusions 110, all of which are perforated to facilitated airflow through drawer 101. Side walls 108 connect to the two ends of back wall 109 to form a U-shaped support casing that forms the front, right, and back walls for drawer 101. The ends of side walls 108 also have protrusions 110 which extend at a right angle towards each other which are used to secure the inside plates to drawer 101. The inside compartments may either be secured together by fasteners or they may be welded together.

The top of drawer 101 is formed by top plate 111 which extends over the full length of drawer 101. Top plate 111 is also perforated to help facilitate air flow into and out of drawer 101 like the rest of the walls and plates. Top plate 111 has notch 112 along its left side which is a straight segmented cut out which is added to help facilitate objects being stored inside drawer 101 on vented posts 119. Since vented posts 119 extend upward towards top plate 111 there could have been issues with placing shoes or other equipment on them in order to dry, so notch 112 provides a way to place equipment onto posts 119 without issue. Without notch 112 the user might have to wedge their equipment into place or their equipment just might not have fit into drawer 101. Attached to the top of top plate 111 are rail support 125 and rail guide 127. Rail support 125 is a thin sheet of material that runs along the edge of top plate 111 and its shape corresponds to notch 112. Attached to the top of top plate 111 is rail guide 127 which is used in conjunction with another rail guide found in locker 11 to support movement of drawer 101 in and out of locker 11. The rail guide in locker 11 is not shown but would be found at the top of the space designed to house drawer 101 in locker 11. Rail guide 127 is connected to top plate 111, which allows for movement forward and back to the extent that these guides interact. This allows for smooth and easy movement of drawer 101 as it will securely stay on these guides.

The bottom of drawer 101 is formed by bottom plate 121 which has lip 122 running along the edges. Bottom plate 121 is rectangular in shape and is also perforated to facilitate airflow through drawer 101. At the edges of bottom plate 121 there is lip 122 which runs along the entire parameter of bottom plate 121. Lip 122 extends vertically for a short distance before stopping making a ridge to prevent items from rolling off of bottom plate 121. Base support 123 is attached to the bottom of plate 121 and provides support for drawer 101. Base support 123 also helps facilitate movement of drawer 101 into and out of locker 11 as base groove 124 in locker 11 is designed to be the shape of support 123 and acts as another guide rail for drawer 101. This helps guarantee that drawer 101 will stay on its track and will be secured in locker 11.

Installed at the back end of bottom plate 121 are two vented protrusions 117. Vented protrusions 117 are flat plates that extend vertically before being angled towards the center of bottom plate 121 and ending with a curved edge. Protrusions 117 are designed in order to hold gloves, socks, masks, or other small equipment that the user desires to hang up to dry. Protrusions 117 also contain perforations along its length to facilitate airflow through drawer 101 and the items hanging on protrusions 117. On the other side of bottom plate 121 there are two vented posts 119. Post 119 are hollow bars that run horizontally along bottom plate 121 before tilting upward and ending in vent 120. Posts 119 are designed in order to store larger objects such as cleats, shoes, and other smaller equipment. Posts 119 work in the same way as the posts from FIGS. 3A and 3B in that equipment is stored onto them and air is circulated through the hollow posts and out from vent 120 on the end to facilitate circulation into the equipment. This airflow can be either achieved through an HVAC system in posts 119 themselves like in the previous embodiment or by airflow through the system. Fan 115 is a potential source of airflow through the system and is attached to fan fastener 113 on side wall 108. This airflow is important when it comes to drying maintaining equipment that is stored in drawer 101. When equipment is used it typically ends up getting covered in sweat, water, or other materials that could cause damage to the equipment if it is not dried. When the user places there equipment onto posts 119 and protrusions 117, this gear will be quickly dried from this airflow. Drying this equipment will help preserve it while also prevent the equipment from acquiring an unpleasant odor that comes when wet clothes or equipment is not dried. Drawer 101 provides a quick way to dry for a user to dry their equipment by using posts 119 and protrusions 117 in conjunction with the airflow from fan 115 and the protrusions throughout the system facilitate the airflow to dry out the equipment.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

I claim:

1. A locker, comprising:

a pair of spaced-apart upstanding side walls;

at least one locker shelf extending at least partially between the pair of upstanding side walls;

a quick dry shoe drawer disposed between the pair of upstanding side walls, the quick dry shoe drawer comprising:

a quick dry area defined by a pair of side walls, a back wall, a top plate, a front plate, and a bottom plate;

handle extending outwardly from the front plate;

a vent disposed through the front plate, the vent being configured to allow air to flow in, around, and out of the quick dry area;

a fan disposed on one of the upstanding side walls, the fan being configured to push air around the quick dry area, vented protrusions extending upwardly outwardly from a back end of the bottom plate, the vented protrusions being configured to receive equipment;

vented posts extending upwardly outwardly from the bottom plate back-wall, the vented posts being configured to receive equipment;

a vent end disposed at an end of the vented posts opposite the bottom plate, the vent end being configured to allow air to flow through the at least one vented post into the equipment; and a rail guide disposed on a rail support coupled to the top plate, the at least one rail guide being configured to move the quick dry shoe drawer between an open and a closed position.

2. The locker of claim 1, wherein the top plate is perforated.

3. The locker of claim 1, wherein the bottom plate is perforated.

4. The locker of claim 1, wherein the vented protrusions are perforated.

5. The locker of claim 1, wherein the quick dry shoe drawer is coupled to and operably associated with an HVAC system of a room in which the locker is located.

6. The locker of claim 1, wherein each of the vented posts comprises:

a hollow bar extending upwardly from the bottom plate of the quick dry area;

wherein air flows through the hollow bar and against equipment stored within the quick dry area.

7. The locker of claim 1, further comprising:

a lip extending up along an edge of the bottom plate.

8. The locker of claim 1, further comprising:

a base support extending outwardly from a bottom surface of the bottom plate; and a base groove disposed between the pair of upstanding side walls, the base groove being configured to receive the base support.

9. The locker of claim 1, wherein each of the vented protrusions is flat.

* * * * *